(12) United States Patent
Penley et al.

(10) Patent No.: US 10,899,456 B2
(45) Date of Patent: Jan. 26, 2021

(54) DYNAMICALLY TILTED SEAT PAN

(71) Applicant: Rockwell Collins, Inc., Cedar Rapids, IA (US)

(72) Inventors: Randy Penley, Pfafftown, NC (US); Jeff B. Thompson, Lewisville, NC (US); Bradley Barg, Advance, NC (US); Jay Pierson-Moonan, Pfafftown, NC (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 157 days.

(21) Appl. No.: 15/727,361

(22) Filed: Oct. 6, 2017

(65) Prior Publication Data

US 2019/0106215 A1   Apr. 11, 2019

(51) Int. Cl.

| | |
|---|---|
| *B60R 21/207* | (2006.01) |
| *B60N 2/427* | (2006.01) |
| *B64D 11/06* | (2006.01) |
| *B60R 21/18* | (2006.01) |
| *B60R 21/23* | (2006.01) |

(52) U.S. Cl.
CPC .......... *B64D 11/0619* (2014.12); *B60N 2/427* (2013.01); *B60N 2/4279* (2013.01); *B60N 2/42763* (2013.01); *B60R 21/18* (2013.01); *B60R 21/23* (2013.01); *B64D 11/06205* (2014.12)

(58) Field of Classification Search
CPC .......... B64D 11/0619; B64D 11/06205; B60N 2/427; B60N 2/42763; B60N 2/4279; B60R 21/18; B60R 21/23
See application file for complete search history.

(56) References Cited

U.S. PATENT DOCUMENTS

| | | |
|---|---|---|
| 4,349,167 A | 9/1982 | Reilly |
| 5,558,399 A | 9/1996 | Serber |
| 5,681,091 A | 10/1997 | Larson et al. |
| 5,961,073 A | 10/1999 | Wittmann |

(Continued)

FOREIGN PATENT DOCUMENTS

WO    9729924 A1    8/1997

OTHER PUBLICATIONS

Search Report dated Mar. 13, 2019 for EP Patent Application No. 18194052.9.

*Primary Examiner* — James A English
(74) *Attorney, Agent, or Firm* — Suiter Swantz pc llo (57) ABSTRACT

An apparatus for dynamically tilting a seatpan in an aircraft passenger seating assembly includes a seat frame, seatback, seat cushion, and cushion support structure (e.g., a seatpan), the seat cushion and seatpan together having a forward end and a rear end and together supporting a passenger occupying the seating assembly. Accelerometers may detect an inertial event such as a rapid deceleration that may cause the passenger to pitch forward; dynamic seatpan actuators (e.g., airbags or ballistic devices) connected to the accelerometers react to the inertial event by detonating, driving the seatpan and seat cushion upward. As a result, the head path of the passenger may be redirected upward, alleviating the risk of passenger injury and component damage. Additional airbags may react to the inertial event by tightening the passenger seatbelt.

3 Claims, 5 Drawing Sheets

(56) References Cited

U.S. PATENT DOCUMENTS

| | | | |
|---|---|---|---|
| 6,203,105 B1* | 3/2001 | Rhodes, Jr. | A47C 4/54 |
| | | | 297/284.6 |
| 6,450,449 B1 | 9/2002 | Podob et al. | |
| 8,100,471 B2* | 1/2012 | Lawall | B60N 2/4279 |
| | | | 297/216.1 |
| 8,888,181 B2* | 11/2014 | Perraut | B60N 2/23 |
| | | | 297/284.11 |
| 9,126,510 B2* | 9/2015 | Hirako | B60N 2/42763 |
| 9,199,560 B2* | 12/2015 | Line | A47C 7/22 |
| 10,246,193 B1* | 4/2019 | Finlay | B64D 11/0647 |
| 2003/0052519 A1 | 3/2003 | Reynolds et al. | |
| 2009/0273166 A1* | 11/2009 | Dufaut | B60R 21/207 |
| | | | 280/730.1 |
| 2010/0001560 A1* | 1/2010 | Gross | B60N 2/42763 |
| | | | 297/216.1 |
| 2010/0060045 A1* | 3/2010 | Gross | B60N 2/4221 |
| | | | 297/216.1 |
| 2010/0066142 A1* | 3/2010 | Gross | B60N 2/42763 |
| | | | 297/284.1 |
| 2013/0056964 A1* | 3/2013 | Yamashita | B60N 2/42718 |
| | | | 280/730.1 |
| 2013/0285426 A1* | 10/2013 | Arant | B60N 2/62 |
| | | | 297/284.1 |
| 2016/0090058 A1 | 3/2016 | Lee | |
| 2016/0288752 A1* | 10/2016 | Stancato | B60R 21/0136 |
| 2016/0318612 A1 | 11/2016 | Deevey et al. | |
| 2017/0057385 A1 | 3/2017 | Kanto et al. | |

* cited by examiner

DYNAMICALLY TILTED SEAT PAN

BACKGROUND

Aircraft seats are generally configured to sit within a passenger cabin aft of other seats, aft of other interior structures or bulkheads, or at infinite setback (e.g., free of contact with any other seat or structure). In response to a dynamic or inertial event (e.g., a collision, emergency landing, or other event resulting in rapid deceleration) the head of a passenger occupying the seat may be driven into the forward seat or bulkhead, resulting in potential head or neck injuries to the passenger and potential damage to the seat or bulkhead and any incorporated components, e.g., display systems. Even if the seat is at infinite setback, the passenger may still be at risk of lumbar load injury due to, e.g., vertical (downward) axial compression of the pelvis and lumber column. Similarly, passengers in row-to-row-setback and infinite-setback seats alike may be subject to spinal extension forces in response to a dynamic event, e.g., as the head and neck are driven forward while the lower spinal column and pelvis are restrained by the passenger's seatbelt. Conventional approaches to this problem have realized that the risk of injury (as well as the secondary risk of component damage) may be alleviated by redirecting the head path in response to a dynamic event. However, mechanically based approaches have been ineffective in redirecting the head path with the necessary millisecond-level dynamic timing.

SUMMARY

Broadly speaking, embodiments of the inventive concepts disclosed herein are directed to a passenger seating assembly (e.g., aircraft main cabin seating) configured for mitigating injury and damage factors in response to an emergency landing or other dynamic event. The seating assembly detects the dynamic event and modifies the head path by driving the forward end of the seatpan upward. As a result, the risk of passenger injuries, e.g., due to impact with the forward seatback, may be reduced. Similarly, the reduced risk of impact injury may allow for more feature-rich seatback or bulkhead designs, as well as reductions in seat pitch.

In a first aspect, embodiments of the inventive concepts disclosed herein are directed to an apparatus for dynamic seatpan tilting in a passenger seat. The apparatus includes a seat cushion and a seatpan or similar cushion support structure, the cushion and seatpan together having a forward end and a rear end. The apparatus includes accelerometers or similar detectors mountable to the passenger seat and configured to detect a rapid deceleration of the aircraft or a similar dynamic or inertial event via which the passenger would be pitched forward. The apparatus includes dynamic seatpan actuators (DSA) connected to the detectors. When a dynamic/inertial event is detected, the DSAs respond by driving the forward end upward to modify the head path of a passenger occupying the passenger seat.

In a further aspect, embodiments of the inventive concepts disclosed herein are directed to a dynamically tilting passenger seat assembly. The seat assembly includes a seat frame mountable within an aircraft cabin and a seatback coupled to the seat frame. The seat assembly includes a seat cushion and seatpan, together having a forward end and a rear end. The seat cushion and seatpan, together with the seat frame and seatback, collectively support a passenger occupying the seat assembly. The seat assembly includes accelerometers or similar detectors mounted to the seat frame and oriented to detect a rapid deceleration of the aircraft or a similar dynamic or inertial event via which the passenger would be pitched forward. The seating assembly includes dynamic seatpan actuators (DSA; e.g., airbags) connected to the detectors and positioned between the seatpan and the seat cushion. In response to a detected dynamic/inertial event, the DSAs activate (e.g., detonate; inflate) to drive the forward end of the seat cushion upward to modify the head path of the passenger.

In a still further aspect, embodiments of the inventive concepts disclosed herein are directed to a dynamically tilting passenger seat assembly. The seat assembly includes a seat frame mountable within an aircraft cabin and a seatback coupled to the seat frame. The seat assembly includes a seat cushion and seatpan (or similar cushion support structure) together having a forward end and a rear end. The seat cushion and seatpan, together with the seat frame and seatback, collectively support a passenger occupying the seat assembly. The seat assembly includes accelerometers or similar detectors mounted to the seat frame and oriented to detect a rapid deceleration of the aircraft or a similar dynamic or inertial event via which the passenger would be pitched forward. The seating assembly includes dynamic seatpan actuators (DSA; e.g., ballistic devices) connected to the detectors and positioned beneath the seatpan. In response to a detected dynamic/inertial event, the DSAs activate (e.g., detonate, inflate) to drive the forward end of the seatpan (and the seat cushion) upward to modify the head path of the passenger.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a dynamically tilting seating assembly. The seating assembly may be configured for aircraft main cabin seating in row-to-row setback or infinite-setback configurations. By detecting dynamic events and propelling the seatpan upward with dynamic timing not achievable by conventional mechanical means, the seating assembly may redirect the head path, reducing the risk of injury to passengers and damage to forward components (e.g., seatbacks and bulkheads). As a result, seating may be mounted closer to bulkheads or with reduced pitch, and feature-rich forward seatbacks and bulkheads may be contemplated.

Figure 1:
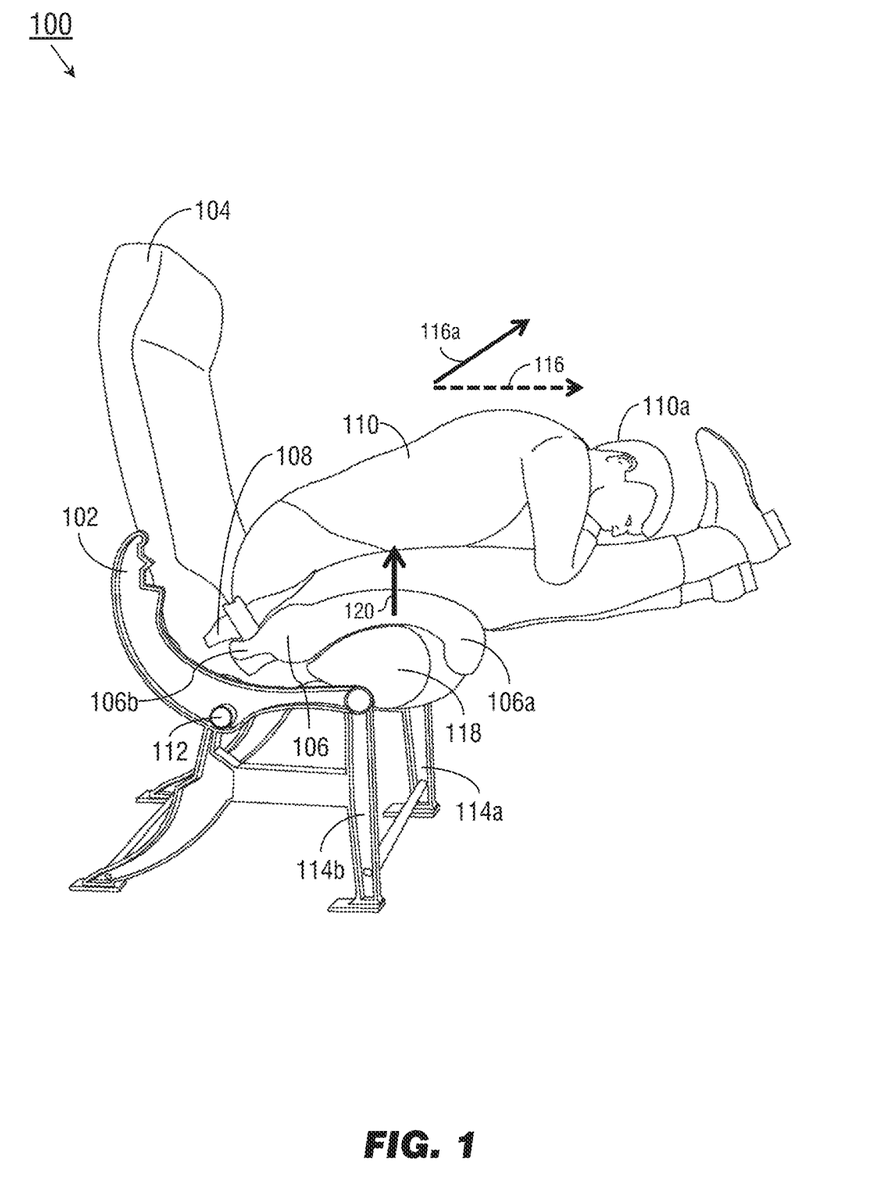
FIG. 1 illustrates an exemplary embodiment of a system according to the inventive concepts disclosed herein.

Referring to FIG. 1, an exemplary embodiment of a dynamically tilting seat assembly 100 according to the inventive concepts disclosed herein may include a seat frame 102, a seatback 104, a seat cushion 106, and a seatbelt 108 for restraining a passenger 110 supported by the seat cushion 106 and seatback 104 (e.g., seated in the dynamically tilting seat assembly 100). The seat cushion 106 may be supported by a seatpan (see FIG. 2A/B) or similar cushion support structure, the seat cushion and seatpan together defining a forward end 106a and a rear end 106b. For example, the rear end 106b may be proximate to the seatback 104 or pivotably attached to the seatback or seat frame via a rail (112) or similar cross-member extending laterally from the left side of the dynamically tilting seat assembly 100 to the right side (e.g., connecting a left frame member 114a and a right frame member 114b). The seat cushion 106 upon which the passenger 110 may be seated may be removably positioned over the seatpan. The seat frame 102 may be bolted or otherwise fixed to the interior cabin of an aircraft. The seatbelt 108 may be an adjustable lap belt with a quick-release buckle that fastens around the waist, or a more complex harness including shoulder restraints.

In the event of a dynamic event (e.g., inertial event, such as an emergency landing resulting in a rapid deceleration of the aircraft), the passenger 110 may be suddenly pitched forward (116) relative to the aircraft (and to the seat frame 102, fixed to the aircraft). While the passenger 110 may be partially restrained by the seatbelt 108, the passenger's head (110a) may remain at risk of collision with a forward seatback or bulkhead. Additionally, in both row-to-row-setback and infinite-setback cases, if the passenger 110 is restrained by the seatbelt 108 at the waist and the head 110a is unrestrained, the passenger may be at risk of injury due to spinal extension forces, as the head 110a pitches forward while the pelvis remains relatively stationary.

The dynamically tilting seat assembly 100 may respond to dynamic events via one or more systems configured to detect the associated rapid deceleration and respond to the dynamic event within milliseconds, redirecting the path (116) of the head 110a upward (116a). For example, the dynamically tilting seat assembly 100 may include a cushion airbag (118) or similar dynamic seatpan actuator (DSA) positioned under the seat cushion 106 but above the seatpan. The cushion airbag 118 may, in some embodiments, be partially or totally disposed within the seat cushion 106 (e.g., the seat cushion 106 may itself detonate and inflate as a cushion airbag/DSA). The cushion airbag 118 may be positioned toward the forward end (106a) of the seat cushion 106 (e.g., between the seatpan and the seat cushion) and connected to an accelerometer or like sensor for detecting forward acceleration (e.g., generally parallel to the roll axis of the aircraft). The accelerometer may be mounted anywhere to the seat frame 102 or to the dynamically tilting seat assembly 100, as long as the accelerometer is properly oriented to detect a shift in forward acceleration. For example, the accelerometer may detect a rapid shift in acceleration characteristic of, or associated with, a dynamic or inertial event. If the shift in acceleration reaches a threshold magnitude, the accelerometer may trigger a detonation device, rapidly inflating the cushion airbag 118 and driving the forward end 106a upward (120) and redirecting the head path (116) similarly upward (116a). The head 110a may thus be less likely to collide with a seatback or bulkhead forward of the dynamically tilting seat assembly 100. It should also be noted that while the cushion airbag 118 is positioned underneath the forward end 106a of the seat cushion 106, the rear end 106b may be slightly elevated as well by the inflation of the cushion airbag 118, reducing the risk of spinal extension injuries to the passenger 110. Further, the inflation of the cushion airbag 118 may absorb a portion of the lumbar load, e.g., the downward force on the body of the passenger 110 impacting the seat cushion 106 and seatpan, as in the case of an emergency landing.

Figure 2A:
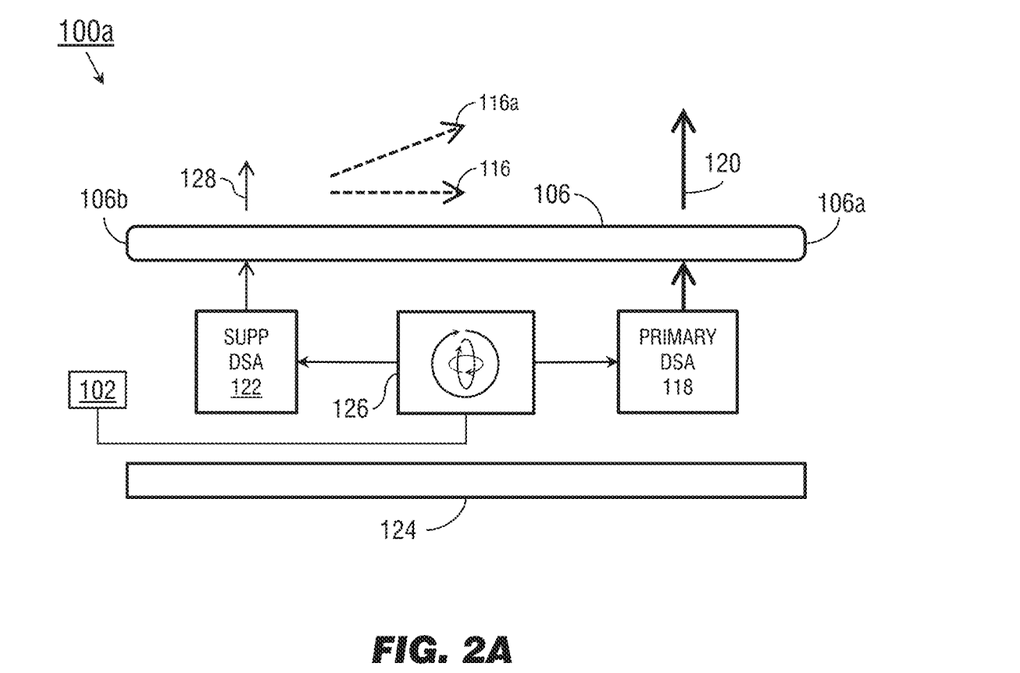
FIGS. 2A and 2B are diagrammatic illustrations of the system of FIG. 1.
Figure 2B:
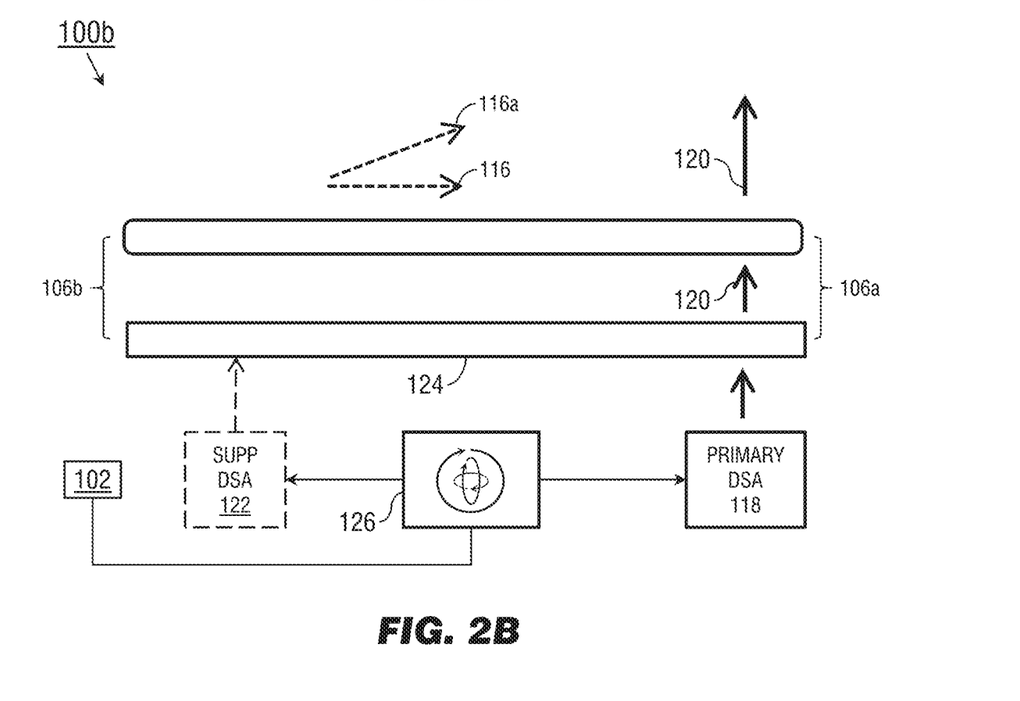

Referring now to FIG. 2A, the dynamically tilting seat assembly 100a may be implemented and may function similarly to the dynamically tilting seat assembly 100 of FIG. 1, except that the dynamically tilting seat assembly 100a may include, in addition to the primary cushion airbag 118 or dynamic seatpan actuator (DSA), a supplemental airbag (122) or similar supplemental dynamic seatpan actuator (DSA) positioned proximate to the rear end 106b, between the seat cushion 106 and the seatpan 124 (e.g., cushion support structure). The supplemental airbag 122 may similarly be connected to, and triggered by, the accelerometer (126) in response to a dynamic or inertial event. However, the supplemental airbag 122 may be smaller than the primary cushion airbag 118 or may deploy with a lesser force. For example, the supplemental airbag 122 may contribute to redirecting the head path (116, 116a) by driving the rear end 106b upward (128) to a lesser degree than the forward end 106a is driven upward (120) by the primary cushion airbag 118, in the process tightening the seatbelt 108.

Referring now to FIG. 2B, the dynamically tilting seat assembly 100b may be implemented and may function similarly to the dynamically tilting seat assembly 100 of FIG. 1, except that the dynamically tilting seat assembly 100b may include a primary DSA 118 positioned beneath the seatpan 124 and configured, in response to the detection of a dynamic/inertial event by the accelerometer 126, to redirect the head path (116, 116a) by driving both the seat cushion 106 and the seatpan 124 upward. A supplemental DSA 122 may additionally be positioned proximate to the rear end 106b.

Figure 3A:
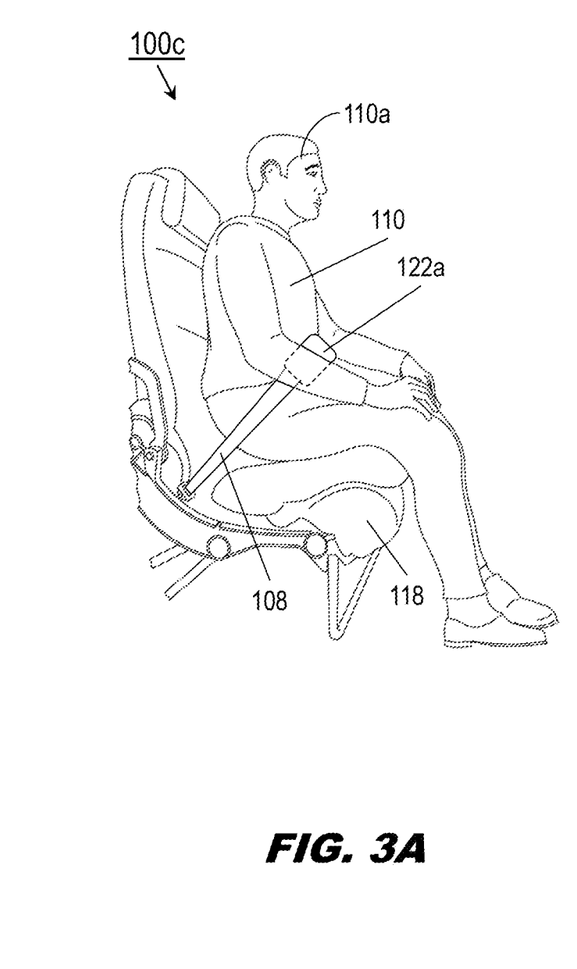
FIGS. 3A and 3B illustrate operations of the system of FIG. 2A.
Figure 3B:
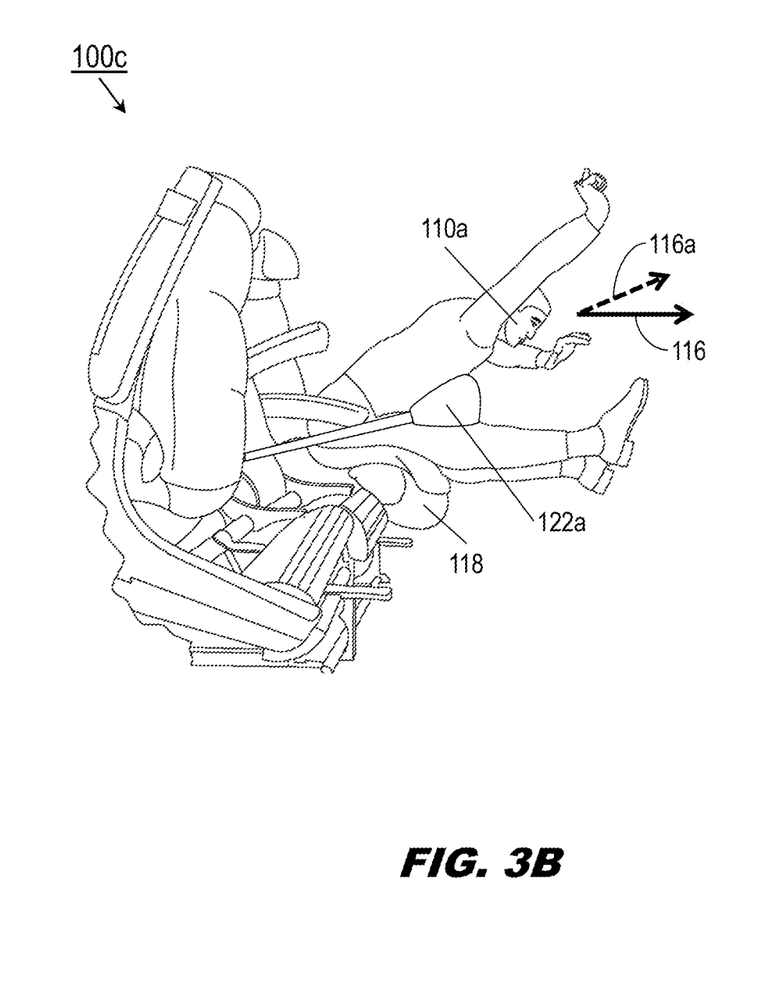

Referring now to FIGS. 3A and 3B, the dynamically tilting seat assembly 100c may be implemented and may function similarly to the dynamically tilting seat assemblies 100a, 100b of FIGS. 2A/2B, except that the dynamically tilting seat assembly 100c may include as a supplemental DSA (122, FIG. 2A) a lap-belt airbag 122a incorporated into the seatbelt 108. Similarly to the cushion airbag 118, the supplemental lap-belt airbag 122a may be triggered by the accelerometer (126, FIGS. 2A/B) and deploy in response to a dynamic event to tighten the seatbelt 108 and secure the passenger 110. The supplemental lap-belt airbag 122a may further restrict the forward component of the head path (116, 116a) by impeding forward momentum of the head (110a) and/or upper torso in response to a dynamic event.

Figure 4A:
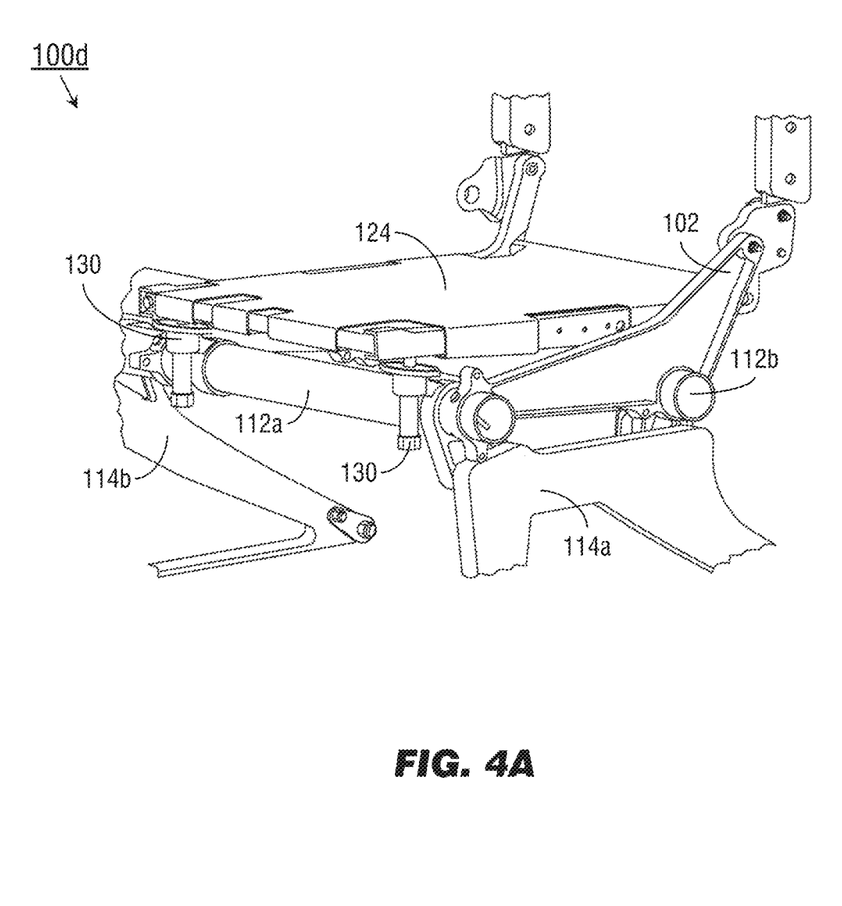
FIGS. 4A and 4B illustrate operations of the system of FIG. 2B.

Referring to FIG. 4A, the dynamically tilting seat assembly 100d may be implemented and may function similarly to the dynamically tilting seat assembly 100b of FIG. 2B, except that the dynamically tilting seat assembly 100d may include one or more ballistic devices 130 disposed underneath the seatpan 124. For example, the ballistic devices 130 may be mounted to one of several lateral rails (e.g., a forward rail 112a and a rear rail 112b) fixed to the seat frame 102 and laterally connecting, e.g., left and right portions 114a-b of the seat frame (substantially parallel to the pitch axis of the aircraft) underneath one or more seats (e.g., the dynamically tilting seat assembly 100d may be a multi-seat assembly incorporating two or more single-passenger seats, each with its own dedicated set of ballistic devices 130 or cushion airbags (118, FIG. 1)).

Figure 4B:
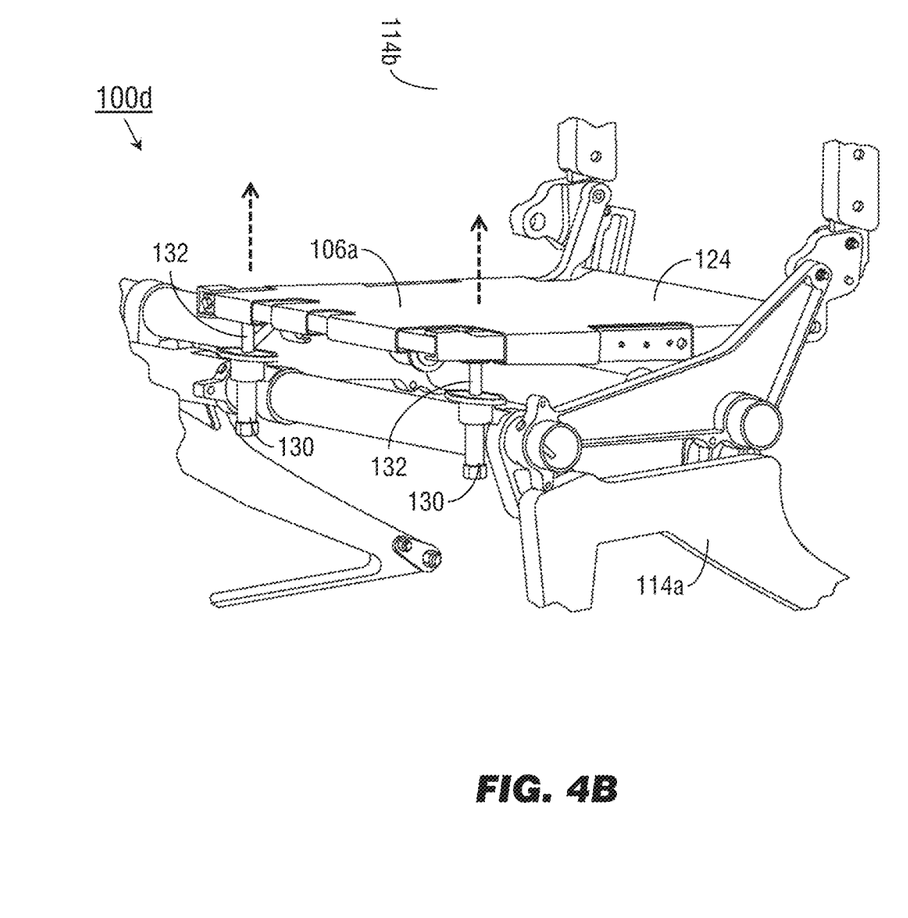

Referring now to FIG. 4B, each ballistic device 130 may be connected to an accelerometer (126, FIG. 2B) or similar sensor and, in response to a dynamic event, activate (e.g., driving a piston (132) upward into the front end 106a of the seatpan 124 and elevating the front end 106a (and the seat cushion (106, FIG. 2B) to redirect the head path (116/116a, FIG. 1). The pistons 132 may be activated by micro gas generators (MGG), solenoids, pyrotechnical actuators, or like means of triggering the piston with the necessary dynamic timing.

As will be appreciated from the above, systems and methods according to embodiments of the inventive concepts disclosed herein may respond to a dynamic event by redirecting the head path upward, rather than forward. The dynamically tilting seat assembly may respond within milliseconds, alleviating passenger injury (head injuries due to collision with forward seats or bulkheads, and neck injuries due to spinal extension forces) while reducing the risk of damage to the forward components. In this way, passenger risk of injury may be reduced, more feature-rich forward seatbacks may be developed, and seat pitch may be reduced with respect to forward bulkheads.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A dynamically tilting seat assembly, comprising:
a seat frame mountable within an aircraft, the seat frame comprising a left-side portion and a right-side portion connected by one or more lateral rails including a forward rail and a rear rail;
a seatpan pivotably coupled to the seat frame, the seatpan having a forward end proximate to the forward rail and a rear end proximate to the rear rail;
at least one detector configured to detect an inertial event associated with the aircraft;
and
at least one ballistic device coupled to the at least one detector and to the forward rail, the at least one ballistic device configured to propel the seatpan upward by driving a piston into the forward end in response to the inertial event.

2. The dynamically tilting seat assembly of claim 1, further comprising:
at least one seatbelt coupled to the seat frame, the at least one seatbelt configured to adjustably secure a passenger occupying the seat assembly;
and
at least one supplemental dynamic seatpan actuator (DSA) disposed proximate to the rear end and coupled to the at least one detector, the at least one supplemental DSA configured to inflate in response to the inertial event.

3. The dynamically tilting seat assembly of claim 2, further comprising:
at least one seatbelt coupled to the seat frame, the at least one seatbelt configured to adjustably secure a passenger occupying the seat assembly;
and at least one second supplemental airbag coupled to the at least one seatbelt.

\* \* \* \* \*